United States Patent
King et al.

(10) Patent No.: US 9,839,997 B2
(45) Date of Patent: Dec. 12, 2017

(54) METHOD OF CALIBRATING TORQUE USING PEAK HOLD MEASUREMENT ON AN ELECTRONIC TORQUE WRENCH

(71) Applicant: Snap-on Incorporated, Kenosha, WI (US)

(72) Inventors: Jerry A. King, Hacienda Heights, CA (US); Chris Lawton, Costa Mesa, CA (US); Duane A. Vallejos, La Puente, CA (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 14/946,023

(22) Filed: Nov. 19, 2015

(65) Prior Publication Data

US 2016/0067850 A1   Mar. 10, 2016

Related U.S. Application Data

(62) Division of application No. 13/888,671, filed on May 7, 2013, now Pat. No. 9,242,356.

(51) Int. Cl.
*B25B 23/142* (2006.01)
*G01L 25/00* (2006.01)

(52) U.S. Cl.
CPC ...... *B25B 23/1425* (2013.01); *B25B 23/1422* (2013.01); *G01L 25/003* (2013.01)

(58) Field of Classification Search
CPC G01L 25/003; B25B 23/1422; B25B 23/1425
See application file for complete search history.

(56) References Cited

U.S. PATENT DOCUMENTS

| | | | |
|---|---|---|---|
| 4,976,133 A | * | 12/1990 | Pohl ................... G01L 25/003 73/1.11 |
| 2005/0126351 A1 | | 6/2005 | Becker et al. |
| 2010/0170369 A1 | * | 7/2010 | Yokoyama .......... B25B 23/1425 81/467 |
| 2013/0047799 A1 | | 2/2013 | Gareis |

FOREIGN PATENT DOCUMENTS

| | | |
|---|---|---|
| TW | 201207364 A | 2/2012 |
| TW | 201224416 A | 6/2012 |

OTHER PUBLICATIONS

Taiwan Office Action of the Intellectual Property Office, dated Oct. 21, 2015; 5 pages.
Taiwan Search Report dated Oct. 2, 2015; 1 page.
Canadian Intellectual Property Office, Examiner's Report dated Jun. 23, 2016; 3 pages.

* cited by examiner

*Primary Examiner* — Daniel S Larkin
(74) *Attorney, Agent, or Firm* — Seyfarth Shaw LLP

(57) ABSTRACT

The present disclosure relates to an electronic torque tool, a calibration fixture, and a method for calibrating the electronic torque tool. The calibration includes applying a torque to the torque wrench and releasing the applied torque once the applied torque reaches a full scale calibration torque. The calibration fixture holds and displays a peak value of the applied torque and the torque wrench holds and displays a measured peak value of the applied torque. The measured peak value on the torque wrench may then be adjusted, by incrementing or decrementing the displayed value, to match the peak value displayed on the calibration fixture.

4 Claims, 4 Drawing Sheets

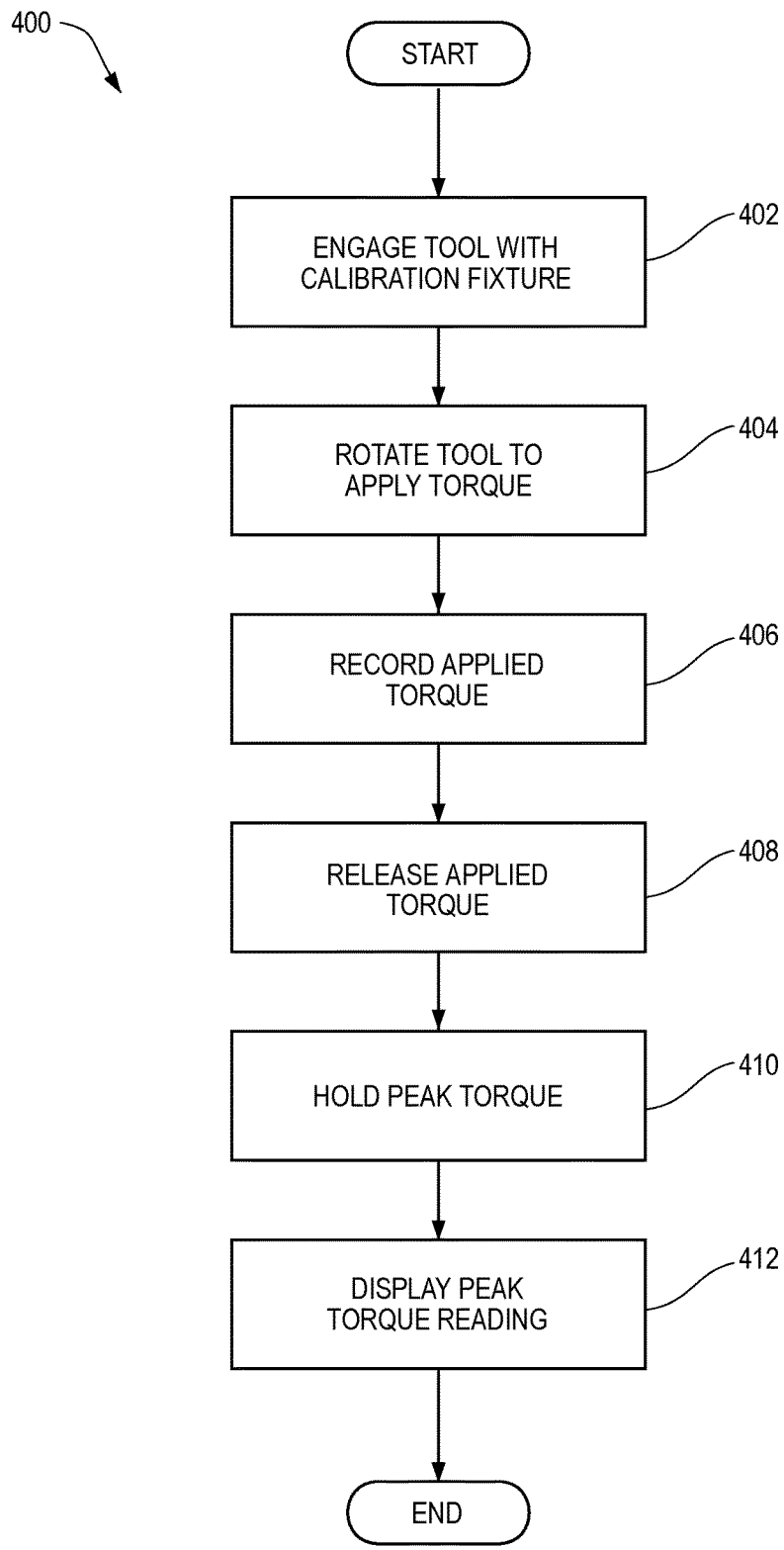

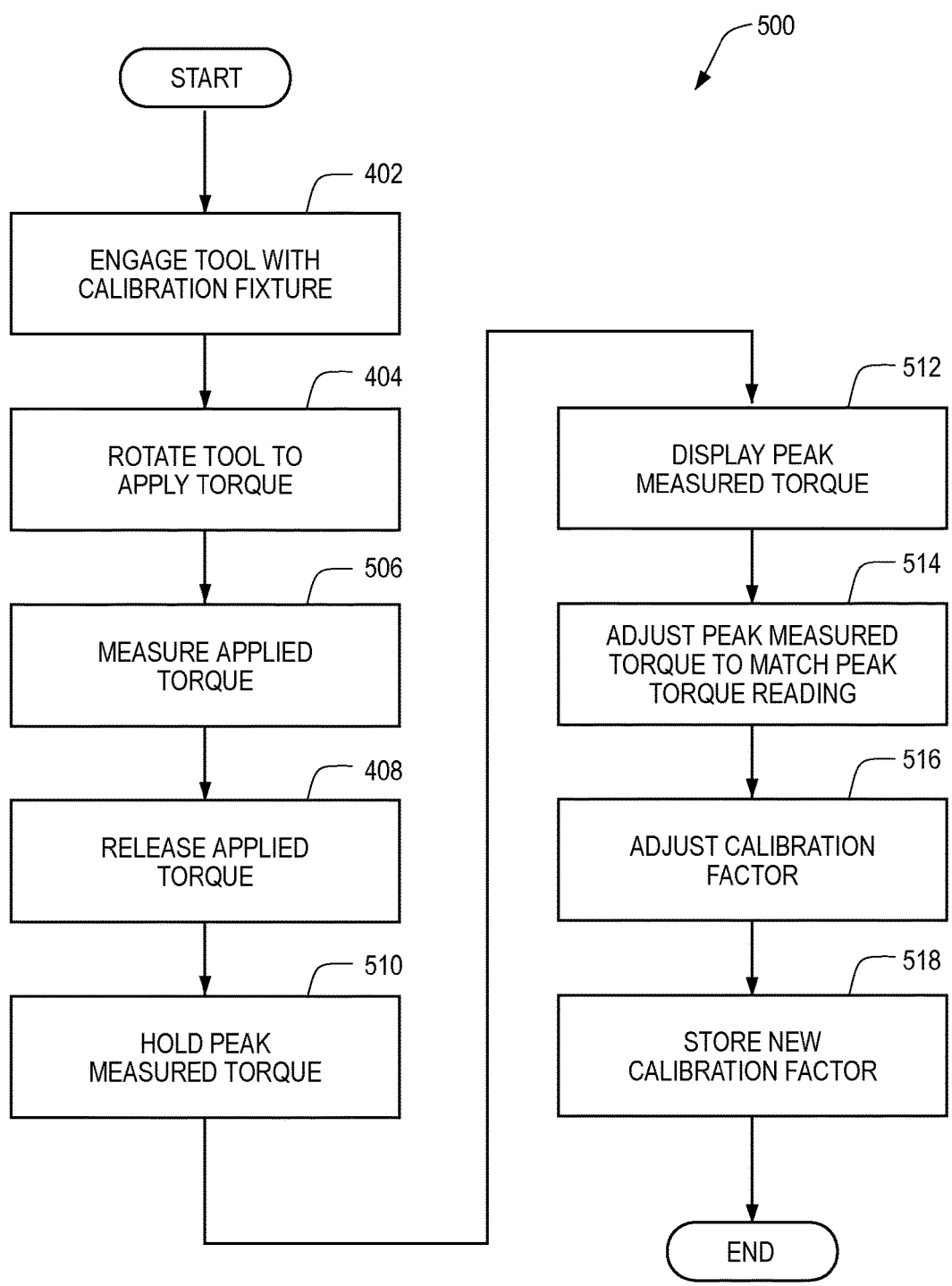

METHOD OF CALIBRATING TORQUE USING PEAK HOLD MEASUREMENT ON AN ELECTRONIC TORQUE WRENCH

CROSS-REFERENCE TO RELATED APPLICATIONS

The present application is a divisional of U.S. application Ser. No. 13/888,671, filed May 7, 2013, the contents of each which are herein incorporated by reference in their entirety.

TECHNICAL FIELD OF THE INVENTION

The present application relates to tools for applying torque to a work piece. More particularly, the present application relates to systems and methods for calibrating electronic torque wrenches.

BACKGROUND OF THE INVENTION

Electronic torque wrenches are commonly used in automotive and industrial applications to apply a predetermined amount of torque to a work piece. For example, a fastening system may require tightening components, such as a nut and bolt in a threaded fastening system, to a desired force or torque or within a desired torque range. Securing the fastening components at a desired torque setting allows for secure attachment of the components and structures related thereto without under-tightening or over-tightening the components. Under-tightening the components could result in unintended disengagement of the components. Over-tightening the components could make disengaging the components difficult or could cause damage to the components or the threaded fasteners. To prevent under-tightening or over-tightening, a measurement of the amount of torque applied to the work piece can be made while tightening the work piece to meet a target torque setting or to apply a torque within a desired torque range.

When using torque wrenches, it is important to ensure the torque wrenches are calibrated correctly and the amount of torque being measured by the wrench is accurate. Current methods of calibrating a torque wrench to measure accurately generally involve applying a full scale tracking torque to the torque wrench, for example, using a hand crank or rotating the wrench by hand, and maintaining the torque while a measured reading on the torque wrench is adjusted to match an applied torque reading of a calibration fixture. However, the amount of torque applied may drift due to the manual application of the torque. This causes the applied torque reading of the calibration fixture to drift, which requires continual manual adjustment of the applied torque to maintain a constant reading on the calibration fixture while also adjusting the measured reading on the torque wrench.

SUMMARY OF THE INVENTION

The present application discloses a system including an electronic torque tool and a calibration fixture, and a method for calibrating the electronic torque tool. As disclosed, the calibration includes the torque wrench applying a fixed amount of torque and releasing the applied torque once the applied torque reaches a full scale calibration torque. The calibration fixture holds and displays a peak value of the applied torque and the torque wrench holds and displays a measured peak value of the applied torque. The measured peak value on the torque wrench may then be adjusted, by incrementing or decrementing the displayed value, to match the peak value displayed on the calibration fixture, thereby calibrating the torque wrench to ensure that the measured torque applied by the wrench is accurate.

The measured peak value on the torque wrench is based on a current or default calibration factor stored on the torque wrench. When the measured peak value is adjusted, a new or adjusted calibration factor may be calculated to match the measured peak value on the torque wrench with the known peak value displayed on the calibration fixture. The new or adjusted calibration factor is then stored on the torque wrench.

In particular, the present application discloses a method of calibrating a tool. The method involves the tool measuring an amount of torque that is applied by the tool, holding a peak measured torque value corresponding to a calibration factor in response to the torque reaching a peak value and being released, and displaying the peak measured torque value. An adjusted calibration factor may then be generated to cause the peak measured torque value to match a known peak applied torque value displayed on a calibration fixture.

In an embodiment, the tool includes a drive head adapted to apply torque and engage a calibration fixture, a handle extending from the drive head, and a torque sensor disposed in the tool and adapted to measure an amount of the torque being applied by the tool. A processor is disposed in the tool and adapted to hold and display a peak measured torque value in response to the amount of the torque being applied reaching a peak value. The peak measured torque value is based on a calibration factor stored in the tool. A display is provided with the tool and adapted to display the peak measured torque value. A user input interface is also provided with the handle and adapted to allow a user to adjust the peak measured torque value to match a known peak applied torque value displayed on a calibration fixture.

In an embodiment, the calibration fixture includes a torque sensor adapted to record an amount of torque applied by the tool, a processor disposed in the calibration fixture and adapted to display and hold a peak applied torque value in response to the amount of the torque being applied being released, a display in communication with the processor and adapted to display the peak applied torque value by the tool, and a user input interface in communication with the processor and adapted to allow a user to input a calibration torque value into the calibration fixture.

The disclosed tool, calibration fixture, and method of calibration each allows for the adjustment of the torque wrench when no torque is being applied to the torque wrench and eliminates the need to continuously adjust the applied torque while also adjusting the measured reading on the torque wrench.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIG. 4 illustrates a flow chart showing a process from the calibration fixture perspective in accordance with an embodiment of the present application.

FIG. 5 illustrates a flow chart showing a process from the electronic torque wrench perspective in accordance with an embodiment of the present application.

Figure 1:
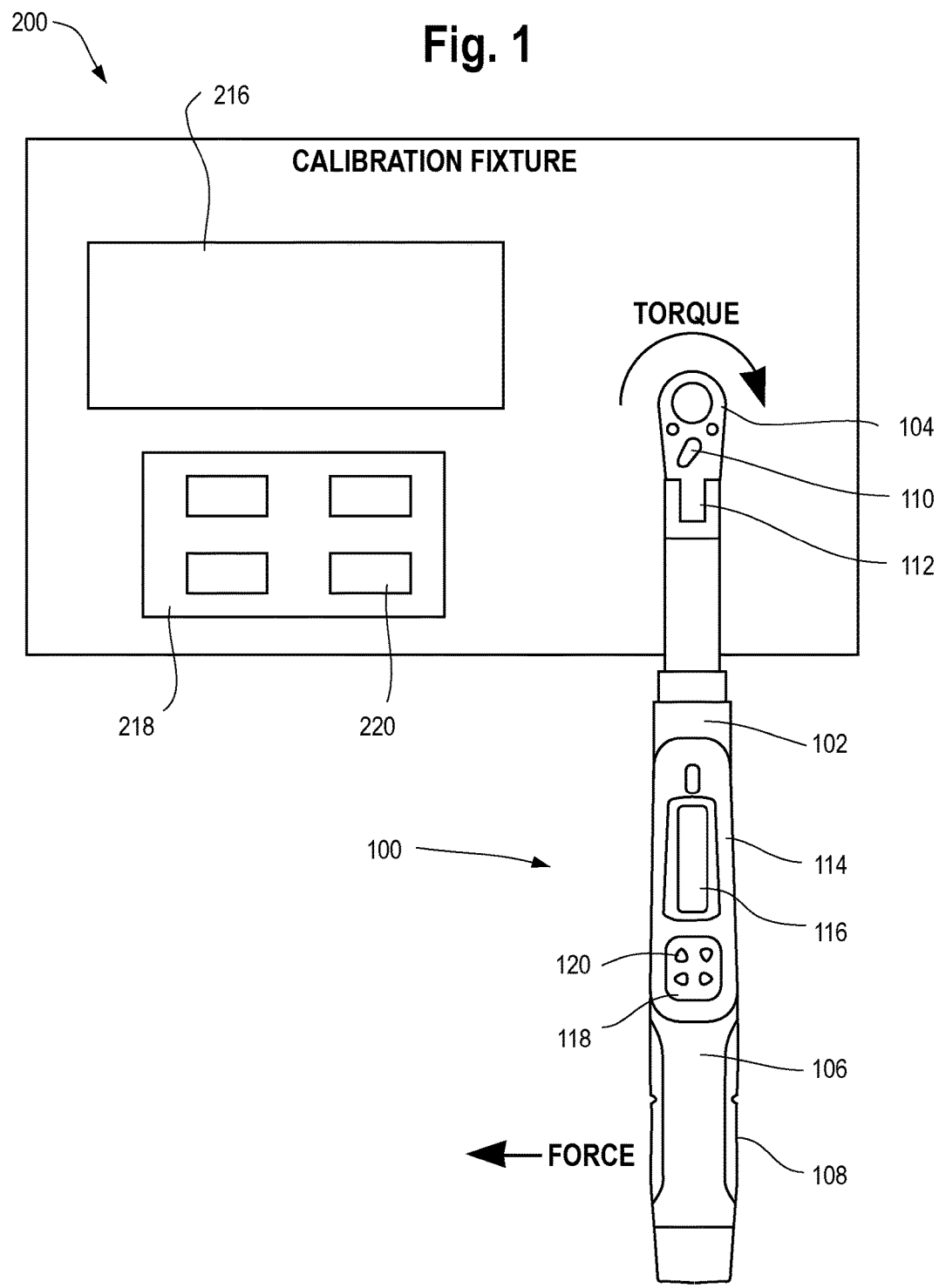
FIG. 1 illustrates a system in accordance with an embodiment of the present application.

It should be understood that the comments included in the notes as well as the materials, dimensions and tolerances discussed therein are simply proposals such that one skilled in the art would be able to modify the proposals within the scope of the present application.

DETAILED DESCRIPTION OF THE EMBODIMENTS

While this invention is susceptible of embodiments in many different forms, there is illustrated in the drawings, and herein described in detail, an embodiment of the invention with the understanding that the present disclosure is to be considered as an exemplification of the principles of the invention and is not intended to limit the broad aspect of the invention to embodiments illustrated.

The present application discloses an electronic torque tool and a calibration fixture, and a method for calibrating the electronic torque tool. The calibration includes the torque wrench applying an amount of torque and releasing the applied torque once the applied torque reaches a full scale calibration torque. The calibration fixture holds and displays a peak value of the applied torque and the torque wrench holds and displays a measured peak value of the applied torque. If the calibration fixture and the torque wrench show different measured amounts of torque, then the measured peak value on the torque wrench may be adjusted by incrementing or decrementing the displayed value to match the known peak value displayed on the calibration fixture.

The measured peak value on the torque wrench is based on a current or default calibration factor stored on the torque wrench. The calibration factor is then applied to the measured torque value from the torque wrench on future uses to ensure that the measured torque value displayed by the torque wrench is accurate. When the measured peak value is adjusted, a new or adjusted calibration factor may be calculated to match the measured peak value on the torque wrench with the peak value displayed on the calibration fixture. The new or adjusted calibration factor is then stored on the torque wrench.

As illustrated in FIG. 1, a tool 100 and a calibration fixture 200 are disclosed. The tool 100 includes a handle 102 and a drive head 104. The handle 102 includes a shaft 106 and can include a grip 108 for holding the handle 102. Although the grip 108 is illustrated as being located at an end of handle 102, the grip may be positioned at other locations along the handle 102, or alternatively, the handle 102 may be fitted with two or more grips for gripping.

The drive head 104 of the tool 100 can include a receiving area or drive lug that, directly or indirectly, applies torque to a work piece. For example, the drive head 104 can couple to a socket adapted to couple with and apply torque to a hex-bolt work piece. As illustrated, the drive head 104 is engaged with the calibration fixture 200. The drive head 104 can also include a reversing lever 110 and a pivot joint 112. The reversing lever 110 may be connected to a pawl (not shown) to selectively operate the tool 100 in a predetermined rotational drive direction. The pivot joint 112 may allow the handle 102 to pivot relative to the head 104 to allow easier accessibility in certain areas.

The tool 100 further includes a controller 114 operatively associated with the tool, for example, being seated in or fixedly attached to the handle 102. The controller 114 may include a display 116 for displaying information related to a torque application to be described more fully hereinafter. The controller 114 also includes a user input interface 118 for inputting instructions and modifying settings of the tool or interacting with menus presented on the display 116. The user input interface 118 allows the user to input information, data, and/or commands into the tool 100. By way of example, the user input interface 118 can include a keyboard, mouse, touch screen, audio recorder, audio transmitter, member pad, or other device that allows for the entry of information from a user. As illustrated in FIG. 1, in an embodiment, the user input interface 118 can include buttons 120, e.g., up/down control buttons, an "enter" key, and other buttons. In one example, the buttons 120 allow the user to adjust a measured torque value displayed on the display 116.

In an embodiment, the display 116 can display various information for the user to view and interpret, for example, text or graphics, or information entered into the user input interface 118. By way of example, the display 116 can include a liquid crystal display (LCD), organic light emitting diode (OLED) display, plasma screen, or other kind of black and white or color display that allows the user to view and interpret information.

The controller 114 may also include circuitry of known construction to sense and record a magnitude of torque applied by the tool 100 during a particular torque application. The controller 114 has volatile or re-writeable memory for storing recorded torque magnitude for later retrieval and/or transmission to other devices.

The calibration fixture 200 includes a controller (illustrated schematically in FIG. 3) including a display 216 for displaying data relating to the calibration fixture 200, and an input interface 218 for inputting instructions and modifying settings of the calibration fixture 200 or interacting with menus presented on the display 216 such as a calibration torque.

Similar to the display 116, the display 216 can display various information for the user to view and interpret, for example, text or graphics, or information entered into the input interface 218. By way of example, the display 216 can include a liquid crystal display (LCD), organic light emitting diode (OLED) display, plasma screen, or other kind of black and white or color display that allows the user to view and interpret information. In one example, the display presents one or more applied toque values to the user.

The input interface 218 allows the user to input information, data, and/or commands into the calibration fixture 200. By way of example, the input interface 218 can include a keyboard, mouse, touch screen, audio recorder, audio transmitter, member pad, or other device that allows for the entry of information from a user. As illustrated in FIG. 1, in an embodiment, the input interface 218 can include buttons 220. In one example, the buttons 220 allow a user to input a calibration torque value into the calibration fixture 200.

Figure 2:
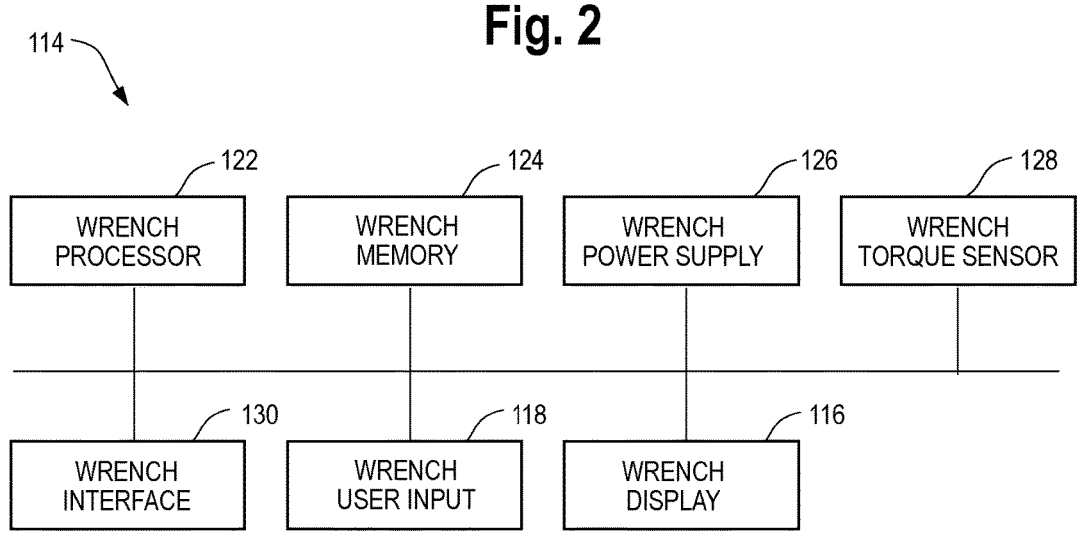
FIG. 2 illustrates a schematic functional block diagram of a controller of an electronic torque wrench in accordance with an embodiment of the present application.

FIG. 2 is a schematic functional block diagram of the controller 114 of the tool 100 in accordance with an embodiment of the present application. In an illustrative embodiment, the controller 114 includes one or more of a wrench processor 122 for controlling operations of the controller 114, a wrench memory 124 for storing data and/or computer programs, a wrench power source 126, a wrench torque sensor 128 to measure and sense an amount of torque applied by the tool 100, a wrench interface 130 for transmitting and/or receiving data relating to the tool 100 to external sources, and the user input interface 118 and the display 116. The above components of the controller 114 can be coupled together, directly or indirectly, by hardwired connections, wireless connections and/or other known coupling means.

The processor 122 facilitates communication between the various components of the tool 100 and controls operation of the electrical components of the tool 100. The processor 122 can be a special purpose or general type of processor or multiple processors, for example, a microprocessor, a single-core or a multi-core processor. In an embodiment, the processor 122 is configured to hold a peak measured torque value applied by the tool 100 and present the measured torque value on the display 116.

In an embodiment, the wrench memory 124 can store data or computer programs for use in the tool 100. For example, the memory 124 can store calibration factors, torque target values, and other such data. The memory 124 can also store an operating system for the controller 114 or other software or data that may be necessary for the tool 100 to function. Without limitation, the memory 124 can include non-transitory computer-readable recording medium, such as a hard drive, DVD, CD, flash drive, volatile or non-volatile memory, RAM, or other type of data storage.

The wrench power source 126 may be, for example, a battery for powering operations of the controller 114 and the tool 100 in general. The power source 126 can be a source of electrical or mechanical power that can power the controller 114. In an embodiment, the power source 126 is a battery. However, the power source 126 can be other components that provide power, including a battery, fuel cell, engine, solar power system, wind power system, hydroelectric power system, a power cord for attachment to an electrical socket, or other means of providing power.

The wrench torque sensor 128 measures a magnitude of torque applied by the tool 100. The wrench torque sensor 128 may be a known mechanism capable of measuring torque. For example, the wrench torque sensor 128 may be a strain gauge or load cell attached to a torsion rod to measure the amount of torque applied by the tool 100.

The wrench interface 130 can be a device capable of transmitting data from the tool 100 or capable of receiving data within the tool 100 from an external data source. By way of example, the wrench interface 130 can be a hard wire connection, such as an insulated copper wire or optical fiber, or a radio transmission antenna, cellular antenna, infrared, acoustic, radio frequency (RF), or other type of wired or wireless interface capable of communicating with an external device.

Figure 3:
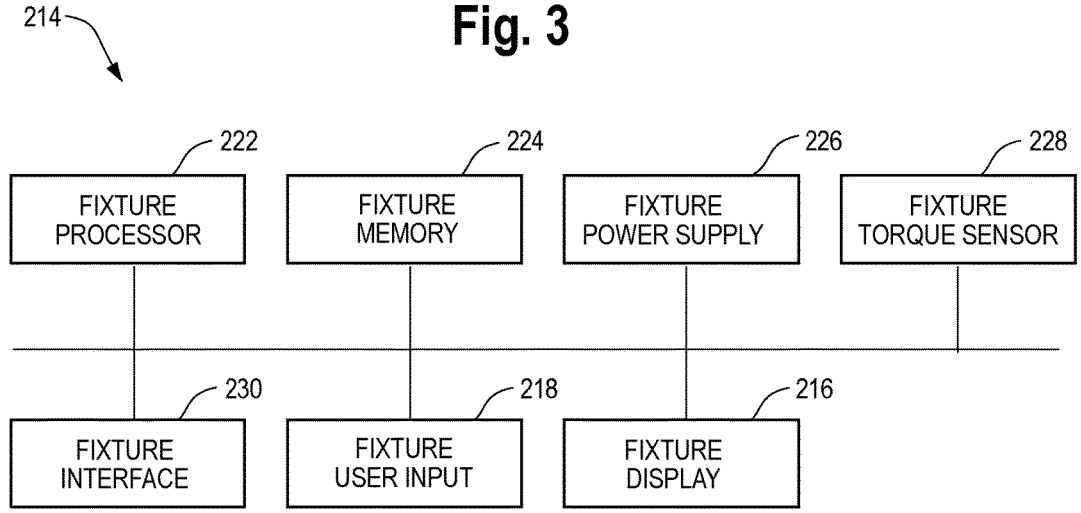
FIG. 3 illustrates a schematic functional block diagram of a calibration fixture in accordance with an embodiment of the present application.

FIG. 3 is a schematic functional block diagram of a controller 214 of the calibration fixture 200 in accordance with an embodiment of the present application. In an illustrative embodiment, the controller 214 includes one or more of a fixture processor 222 for controlling operations of the controller 214, a fixture memory 224 for storing data and/or computer programs, a fixture power source 226, a fixture torque sensor 228 to measure and sense an applied torque, a fixture interface 230 for transmitting and/or receiving data relating to the calibration fixture 200 to external sources, and the user input interface 218 and the display 216. The above components of the controller 214 can be coupled together, directly or indirectly, by hardwired connections, wireless connections and/or other known coupling means.

The processor 222 facilitates communication between the various components of the calibration fixture 200 and controls operation of the electrical components of the calibration fixture 200. The processor 222 can be a special purpose or general type of processor or multiple processors, for example, a microprocessor, a single-core or a multi-core processor. In an embodiment, the processor 222 is configured to hold a peak torque value applied to the calibration fixture 200 and present the peak torque value on the display 216.

The fixture memory 224 can store data or computer programs for use in the calibration fixture 200. For example, the memory 224 can store calibration torque values, peak torque values applied to the calibration fixture 200 and other such data. The memory 224 can also store an operating system for the controller 214 or other software or data that may be necessary for the calibration fixture 200 to function. Without limitation, the memory 224 can include non-transitory computer-readable recording medium, such as a hard drive, DVD, CD, flash drive, volatile or non-volatile memory, RAM, or other type of data storage.

The fixture power source 226 may be, for example, a battery for powering operations of the controller 214 and the calibration fixture 200 in general. The power source 226 can be a source of electrical or mechanical power that can power the controller 214. In an embodiment, the power source 226 is a battery. However, the power source 226 can be other components that provides power, including a battery, fuel cell, engine, solar power system, wind power system, hydroelectric power system, a power cord for attachment to an electrical socket, or other means of providing power.

The fixture torque sensor 228 measures a magnitude of torque applied. The fixture torque sensor 228 may be a known mechanism capable of measuring torque.

The fixture interface 230 can be a device capable of transmitting data from the calibration fixture 200 or capable of receiving data within the calibration fixture 200 from an external data source. By way of example, the fixture interface 230 can be a hard wire connection, such as an insulated copper wire or optical fiber, or a radio transmission antenna, cellular antenna, infrared, acoustic, radio frequency (RF), or other type of wired or wireless interface capable of communicating with an external device.

FIG. 4 illustrates a flowchart illustrating a process 400 according to an embodiment of the present application. As illustrated, the process 400 begins and proceeds to step 402, in which a user engages the drive head 104 of the tool 100 with a corresponding engagement of the calibration fixture 200. The tool 100 is then rotated to apply a torque, illustrated as step 404. The tool 100 may be manually rotated, for example, by hand, or mechanically rotated, for example, by a mechanical device or crank.

As the tool 100 is rotated, the calibration fixture 200 records the magnitude of torque applied by the tool 100, illustrated as step 406. The magnitude of torque being applied by the tool 100 may be continuously displayed on the display 216 of the calibration fixture 200. The torque may continue to be applied until a peak torque value is achieved. The peak torque value may be a calibration value input into the calibration fixture by the user or a selected calibration value selected by the user via the user interface 218.

Upon application of the peak torque, the torque applied may be released, for example, by discontinuing to rotate the tool 100, illustrated as step 408. The calibration fixture 200 holds the peak torque value that was applied, for example, in the memory 224 of the calibration fixture 200, illustrated as step 410, and displays the peak torque value on the display 216, illustrated as step 412.

In an embodiment, the torque sensor 228 may continuously measure the torque being applied and communicate the torque value(s) to the processor 222. The processor 222 may also hold the peak torque value, store the peak torque value in the memory 224, and cause the peak torque value to be displayed on the display 216.

In conjunction with the calibration fixture reading, holding, and displaying the peak torque value, the tool 100 also measures the amount of torque applied. FIG. 5 illustrates a flowchart illustrating a process 500 according to an embodiment of the present application. As described above, the user engages the drive head 104 of the tool 100 with the calibration fixture 200, illustrated as step 402, and the tool 100 is rotated to apply a torque, illustrated as step 404. As the tool 100 is rotated, the tool 100 measures the magnitude of torque applied by the tool 100, illustrated as step 506. The magnitude of torque being applied may be continuously displayed on the display 116 of the tool 100. Upon application of the peak torque, the torque applied is released, for example, by discontinuing to rotate the tool 100, illustrated as step 408. The tool 100 holds the peak measured torque value that was applied, for example, in the memory 124, illustrated as step 510, and displays the peak measured torque value on the display 116, illustrated as step 512.

In an embodiment, the torque sensor 128 may continuously measure the torque being applied and communicate the measured torque value(s) to the processor 122. The processor 122 may also hold the peak measured torque value, store the peak measured torque value in the memory 124, and cause the peak measured torque value to be displayed on the display 116.

Thus, the calibration fixture 200 holds and displays the peak value of torque applied and the tool 100 holds and displays the peak measured torque value applied by the tool 100. If the values displayed on the calibration fixture 200 and the tool 100 match, the tool 100 is likely calibrated correctly and no further action is needed. On the other hand, if the values displayed on the calibration fixture 200 and the tool 100 do not match, the tool 100 is likely not calibrated correctly and is thus indicating the incorrect amount of torque being applied by the tool 100.

The peak measured torque value is based on a current or default calibration factor stored on the tool 100, for example, in memory 124. To calibrate the tool 100, the user can adjust the peak measured torque value displayed on the tool 100 to match the peak value of torque applied displayed on the calibration fixture 200, illustrated as step 514. The peak measured torque value may be adjusted, for example, by incrementing or decrementing the peak measured torque value using the buttons 120 of the user input interface 118, or by a computer interface in communication with the tool 100 through the interface 130, to match the value measured by the calibration fixture 200.

Once the peak measured torque value is adjusted to match the peak value of torque applied displayed on the calibration fixture 200, the processor 122, may use the adjusted value on the tool 100 to generate or calculate a new or adjusted calibration factor to match the peak measured torque value on the tool 100 with the peak value displayed on the calibration fixture 200, illustrated as step 516. The new or adjusted calibration factor is adjusted by an amount required to match the measured torque reading on the tool 100 to the reading on the calibration fixture 200. The new or adjusted calibration factor is then stored on the tool 100, for example, in the memory 124, illustrated as step 518.

This method of calibration allows for the adjustment of the tool 100 when no torque is being applied to the tool 100 and eliminates the need to continuously adjust the applied torque while simultaneously adjusting the measured reading on the tool 100.

As discussed above, the tool 100 is an electronic torque wrench. However, the tool 100 can be other mechanisms for imparting torque to a work piece without departing from the spirit and scope of the present application. For example, and without limitation, the tool 100 can be a ratchet wrench, open wrench, monkey wrench, torque screwdrivers, adjustable click-type torque instruments, torque reading instruments, torque drivers, open head torque wrenches, ratchets, or other tool capable of imparting torque to a work piece.

Similarly, while the calibration fixture 200 is described above as including various parts, features, and elements, the hold and display features can be implemented in other mechanisms for calibrating torque without departing from the spirit and scope of the present application. For example, the calibration fixture may be a fixture that holds the wrench in a fixed horizontal position while rotating the calibration sensor or a calibration fixture where the sensor is fixed and the wrench is rotated in a horizontal or vertical plane.

The matter set forth in the foregoing description and accompanying drawings is offered by way of illustration only and not as a limitation. While particular embodiments have been illustrated and described, it should be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A tool having a drive head adapted to apply a torque, a handle extending from the drive head, and a sensor operably coupled to the drive head and adapted to measure an amount of the torque applied by the drive head, comprising:
   a memory; and
   a processor including instructions to:
      measure, with the sensor, a peak amount of torque applied by the drive head to a calibration fixture, thereby creating a peak tool measured torque value;
      store the peak tool measured torque value in the memory after the amount of torque applied to the calibration fixture is released; and
      apply a calibration factor to the peak tool measured torque value to cause the peak tool measured torque value to match a calibration measured torque value representing the amount of the torque applied by the drive head to the calibration fixture measured by the calibration fixture.

2. The tool of claim 1, wherein the memory is adapted to store the calibration factor.

3. The tool of claim 1, further comprising an interface adapted to transmit data to and receive data from an external source.

4. The tool of claim 1, wherein the processor further includes instructions to generate the calibration factor.

* * * * *